(12) United States Patent
Ringer et al.

(10) Patent No.: US 9,868,481 B1
(45) Date of Patent: Jan. 16, 2018

(54) METHODS AND DEVICES FOR VERTICALLY POSITIONING A FIFTH WHEEL HITCH ASSEMBLY

(71) Applicant: Ring-Co Transit, LLC, Trafalger, IN (US)

(72) Inventors: Chad A. Ringer, Trafalger, IN (US); Jarrett D. Waters, Camby, IN (US)

(73) Assignee: Ring-Co Transit, LLC, Trafalgar, IN (US)

( * ) Notice: Subject to any disclaimer, the term of this patent is extended or adjusted under 35 U.S.C. 154(b) by 0 days.

(21) Appl. No.: 15/074,174

(22) Filed: Mar. 18, 2016

Related U.S. Application Data

(60) Provisional application No. 62/136,120, filed on Mar. 20, 2015.

(51) Int. Cl.
    *B62D 53/08* (2006.01)
(52) U.S. Cl.
    CPC .............................. *B62D 53/0807* (2013.01)
(58) Field of Classification Search
    CPC ....... B62D 53/0807; B60D 1/46; B60D 1/465
    See application file for complete search history.

(56) References Cited

U.S. PATENT DOCUMENTS

| | | | | |
|---|---|---|---|---|
| 3,552,774 A | * | 1/1971 | Gottler | B62D 53/0821 280/425.1 |
| 3,717,273 A | * | 2/1973 | Berends | B62D 53/0821 254/124 |
| 3,810,663 A | * | 5/1974 | Berends | B62D 53/0821 280/425.1 |
| 4,585,248 A | * | 4/1986 | Miller | B62D 53/0871 280/432 |
| 4,671,527 A | * | 6/1987 | Wilson | B62D 53/0821 280/407 |
| 5,464,241 A | * | 11/1995 | Flater | B62D 53/0821 280/425.1 |
| 7,111,862 B1 | * | 9/2006 | Eng | B60G 9/00 280/438.1 |

\* cited by examiner

*Primary Examiner* — Tony Winner
(74) *Attorney, Agent, or Firm* — Taft Stettinius & Hollister LLP

(57) ABSTRACT

A fifth wheel hitch plate assembly adapted to be mounted to a vehicle frame includes a hitch plate component coupled to the frame by a vertical lift component. In one implementation, the vertical lift component includes at least four linkages that are pivotally connected to the hitch plate component and pivotally connected to the vehicle frame, wherein the four linkages operate, together with one or actuating members, to elevate a fifth wheel hitch plate assembly in a vertical or substantially vertical path, i.e., a path substantially perpendicular to the vehicle frame.

15 Claims, 8 Drawing Sheets

METHODS AND DEVICES FOR VERTICALLY POSITIONING A FIFTH WHEEL HITCH ASSEMBLY

CROSS REFERENCE TO RELATED APPLICATIONS

This application claims the benefit of U.S. Provisional Application No. 62/136,120 filed on Mar. 20, 2015, the disclosure of which is incorporated herein by reference in its entirety.

FIELD OF THE DISCLOSURE

The present disclosure relates to a hitch assembly, and more specifically to a hitch assembly that may be repositioned along a substantially vertical axis. In certain aspects, the disclosure relates to devices and methods for elevating a fifth wheel assembly, as used with tractors used in a tractor-trailer combination and the like, in a vertical direction.

BACKGROUND

Terminal tractors (also referred to as spotting tractors, shunt trucks, yard trucks, yard goats, yard jockeys, or mules) are shortened versions of a conventional fifth-wheel truck and have a hydraulic lift coupled to the fifth wheel that is controllable by the operator from the truck cab. The operator can couple the fifth wheel to a trailer and engage the hydraulic lift to raise a front stand of the trailer off the underlying surface to allow movement of the trailer. The ability to raise the front stand of the trailer off the underlying surface from the truck cab allows easier and faster movement of the trailers because the operator does not have to separately raise the front stand of the trailer after it is coupled to the fifth wheel of the terminal tractor.

The prior art describes devices for elevating a fifth wheel hitch assembly mounted to a towing vehicle to engage the fifth wheel hitch assembly with the mating structures on a trailer or other component to which the fifth wheel hitch assembly is to be mated. One design pivotally couples the fifth wheel hitch assembly to an arm coupled to the frame. An actuator raises and lowers the fifth wheel hitch assembly by pivoting the arm relative to the frame.

One disadvantage of fifth wheel hitch assemblies in the prior art is that they utilize lifts that move the fifth wheel hitch assembly in an arc-shaped lift path or other non-linear lift path, which results in stresses being exerted on the fifth wheel hitch assembly and the attached trailer or implement during the mating operation or otherwise complicates the mating operation.

There is an ongoing need for advancements relating to the attachment of a fifth wheel hitch assembly to the mating structures on a trailer or other device to be connected to the fifth wheel hitch assembly and, in particular, the development of devices and methods that place less strain on the tractor drivetrain and the trailer hitch components. The present disclosure addresses this need.

SUMMARY OF THE INVENTION

The present invention provides devices and methods for moving a fifth wheel hitch plate along a vertical or substantially vertical lift path, which provides a number of advantages. For example, the movement of a fifth wheel hitch plate along a vertical or substantially vertical lift path allows for less strain upon the tractor drivetrain as well as the trailer hitch system. This also operates to place the platform on a more predictable path, which provides advantages with regard to an operator connecting glad hands to the trailer or in performing routine maintenance.

The assemblies disclosed herein provide for vertical or substantially vertical elevation of a hitch plate, which relieves the stress that a traditional arc-shaped lift path places upon the drivetrain of a vehicle on which the hitch plate is mounted. A disadvantage of prior art systems is that the arc-shaped lift path places strain upon both the tractor and the trailer during the mating operation, as both have an engaged parking brake. This stress then translates throughout the engine, transmission, axles, wheels, and brakes as the arc-shaped lift in essence causes separation between the tractor and trailer, both of which have brakes applied. The present invention's method and assembly allows for vertical or substantially vertical elevation of the fifth wheel. The fifth wheel assembly, moving in a vertical or substantially vertical path relieves, or considerably reduces the stress placed upon the engine, transmission, axles, wheels, and brakes, as significantly less pressure is placed upon these components. The vertical or substantially vertical path does not force the brake-applied tractor and the brake-applied trailer apart in a manner that places significant stress on the drivetrain upon elevation of the fifth wheel assembly.

The assembly disclosed herein also allows access to the glad hands and air hoses to be connected from the tractor to the trailer, remains at a measurably lower angle to the fifth wheel assembly, to the trailer and the like. Another disadvantage of prior art involves the arc-shaped path of the fifth wheel considerably elevating the platform which the operator utilizes to connect the glad hands, air hoses and the like. The present invention's vertical or substantially vertical lift path greatly reduces the angle at which the platform is elevated, providing a more predictable elevation of the platform and more accessibility for connecting the glad hands, air hoses, and the like. The attenuated elevation of the platform of the fifth wheel assembly also facilitates servicing of the fifth wheel assembly. In prior art systems, the angle at which the platform is positioned when raised makes routine maintenance more difficult. The reduced angle of the platform in the assembly disclosed herein allows for greater accessibility to the fifth wheel and its assembly.

Further embodiments, forms, features, and aspects of the disclosure shall become apparent from the following descriptions.

BRIEF DESCRIPTION OF THE FIGURES

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the invention, reference will now be made to the embodiments illustrated in the figures and specific language will be used to describe the same. It will nevertheless be understood that no limitation of the scope of the invention is thereby intended. Any such alterations and further modifications in the described devices, systems, processes and methods, and such further applications of the principles of the invention as described herein are contemplated as would normally occur to one skilled in the art to which the invention relates.

Figure 1:
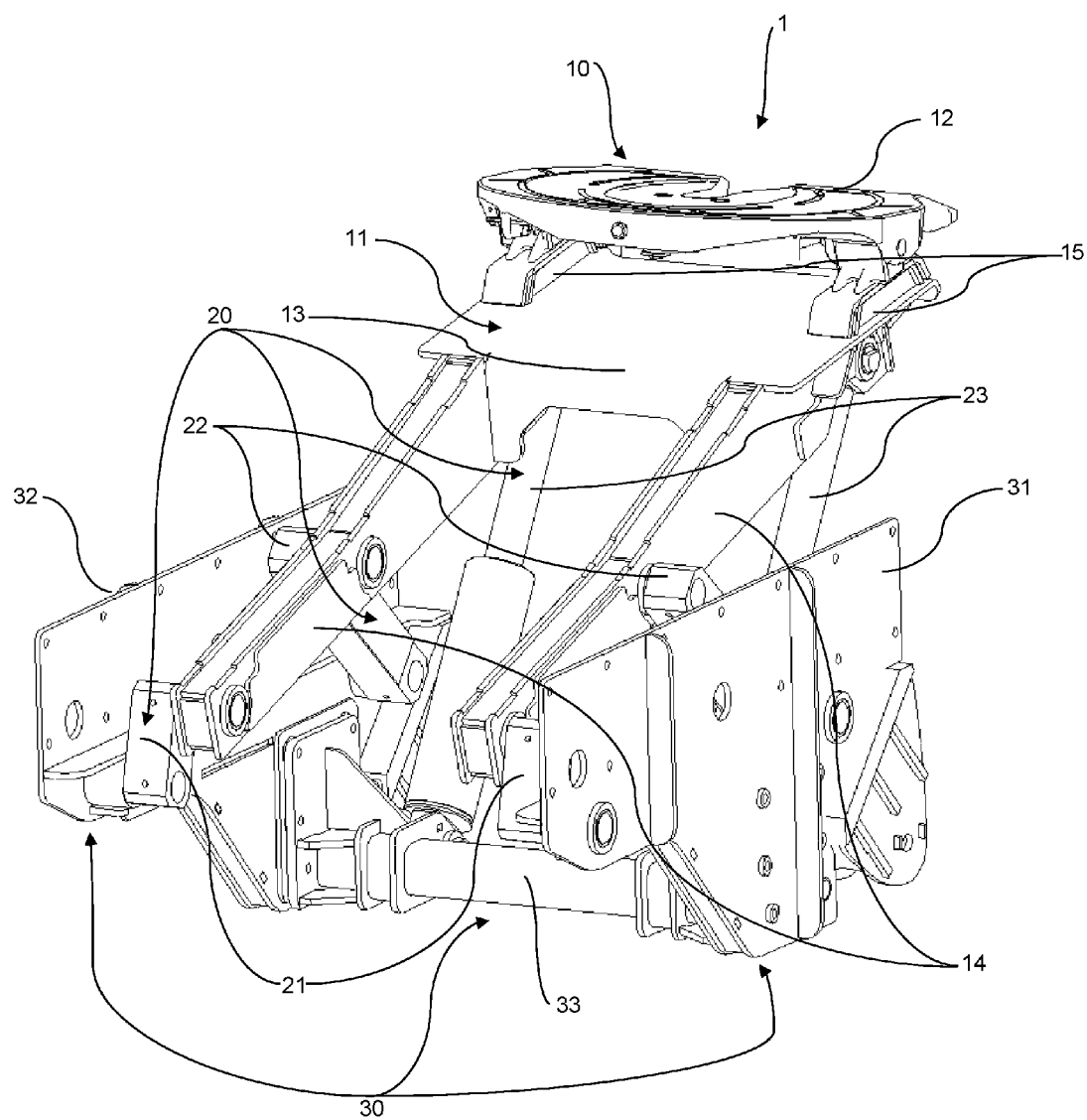
FIG. 1 is a perspective view of one embodiment of a fifth wheel assembly elevated to its highest point utilizing four linkage members.
Figure 2:
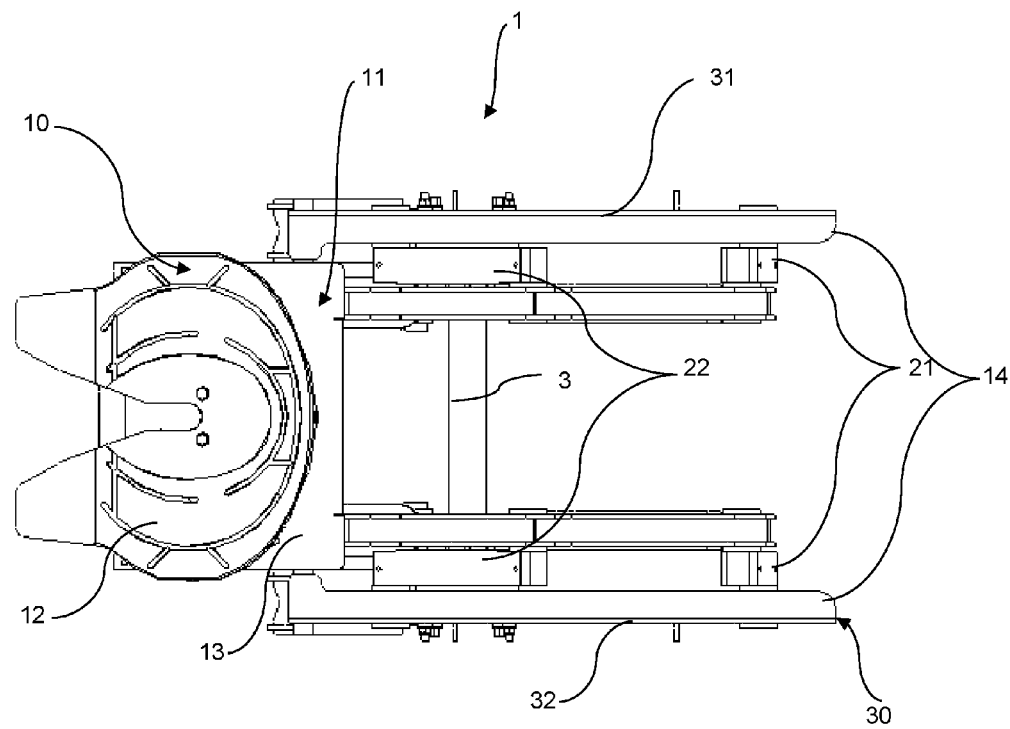
FIG. 2 is a top view and a side elevation view of the embodiment depicted in FIG. 1 as the fifth wheel assembly is vertically lifted perpendicular to the vehicle frame member.
Figure 2:
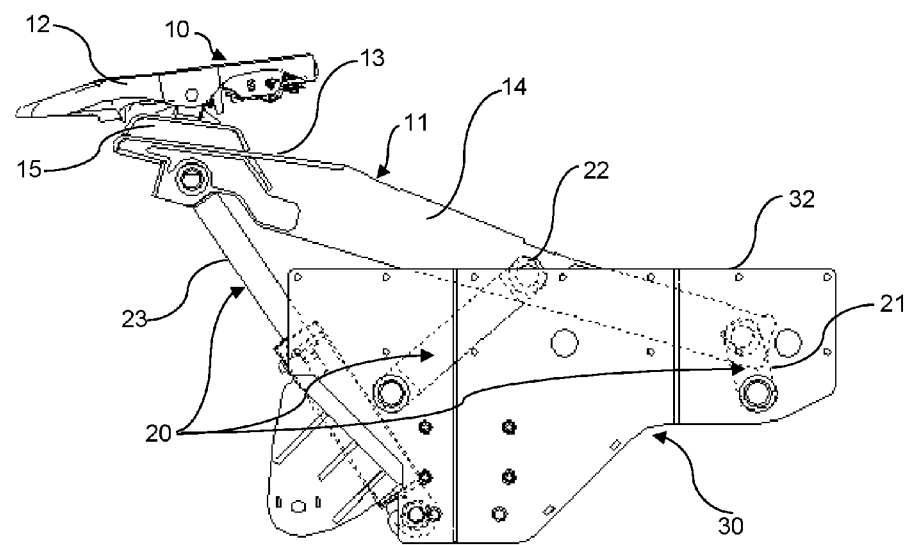
Figure 3:
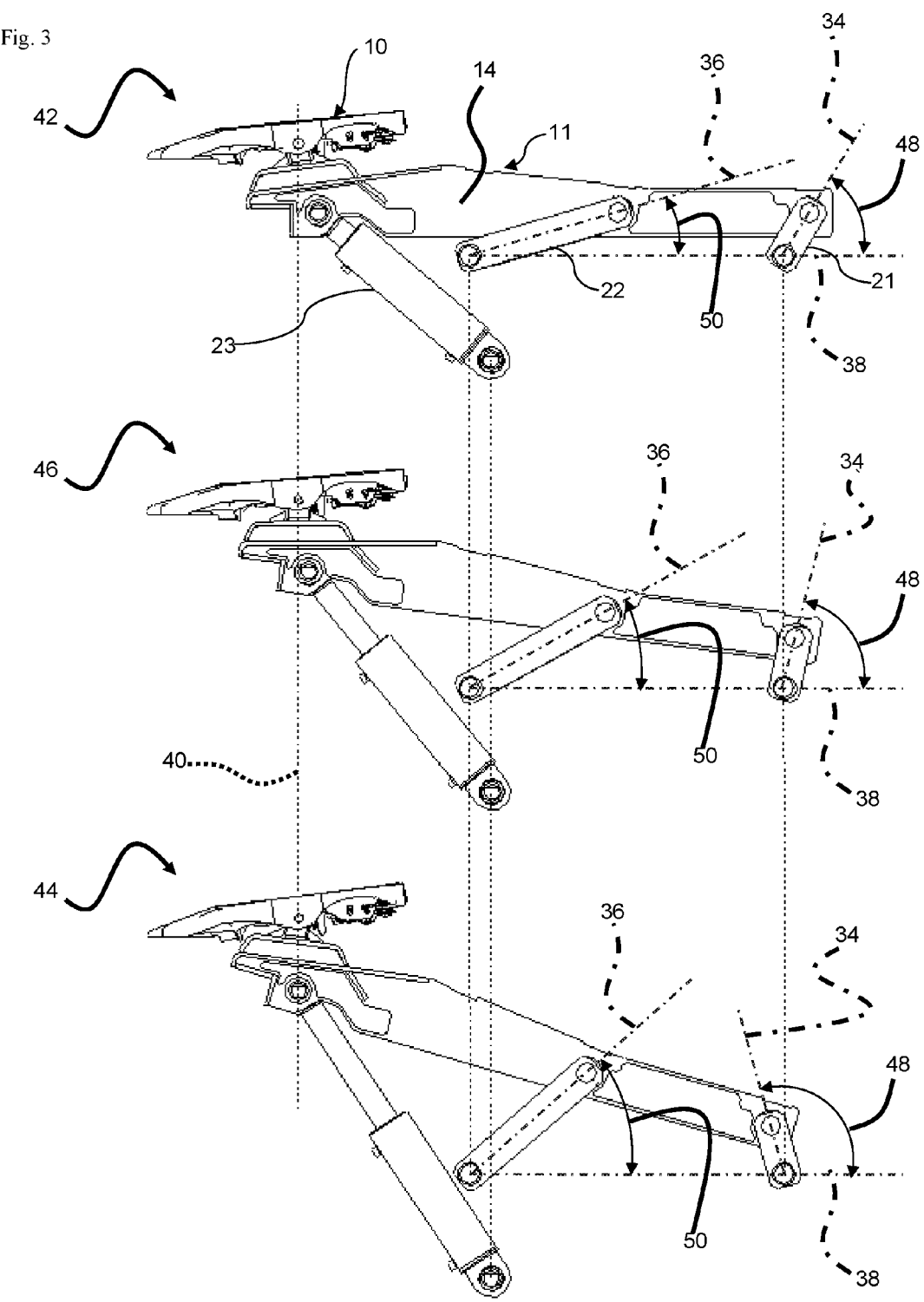
FIG. 3 is a representation of the vertical lift path taken by the fifth wheel assembly embodiment depicted in FIG. 1.
Figure 6:
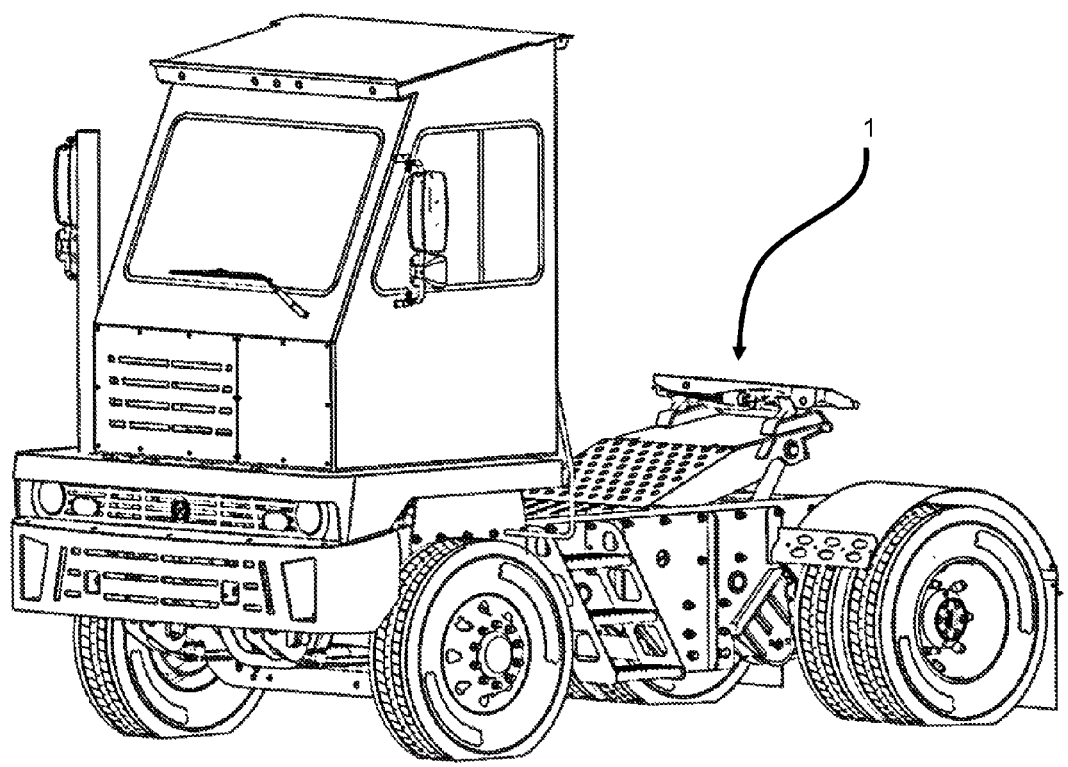
FIG. 6 is a perspective view of a terminal truck implementing the fifth wheel assembly of FIG. 1.
Figure 7:
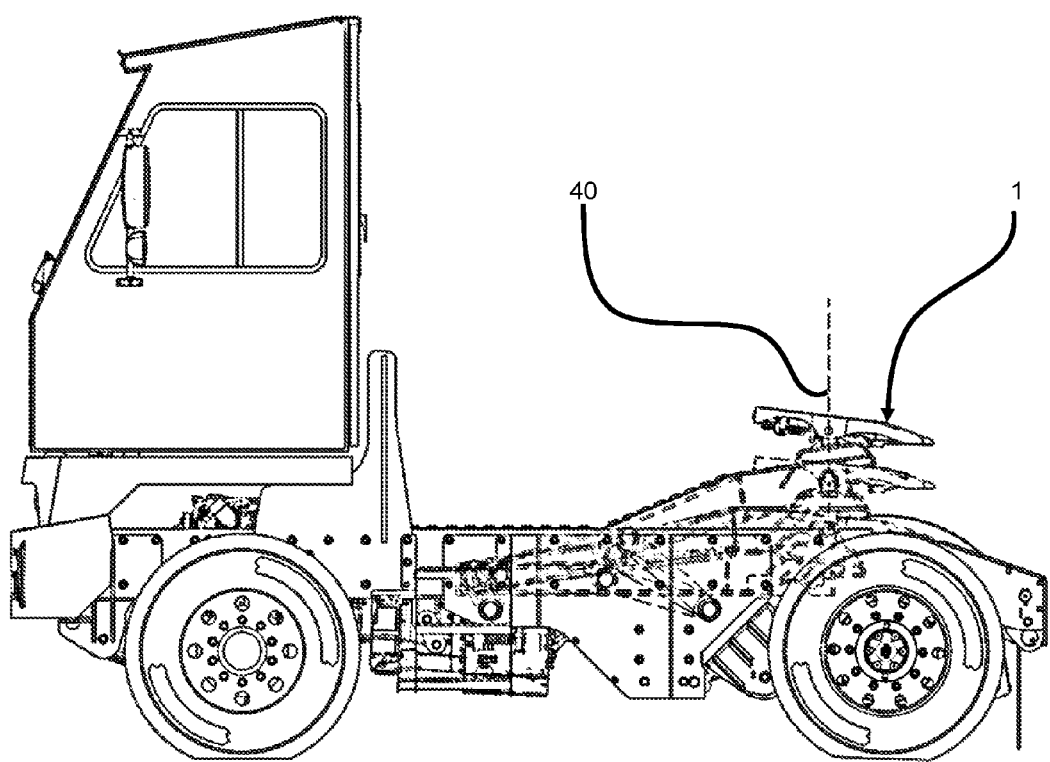
FIG. 7 is a side view of the terminal truck of FIG. 6 with the fifth wheel assembly shown in transitioning between a minimum position and a maximum position along an axis.
Figure 8:
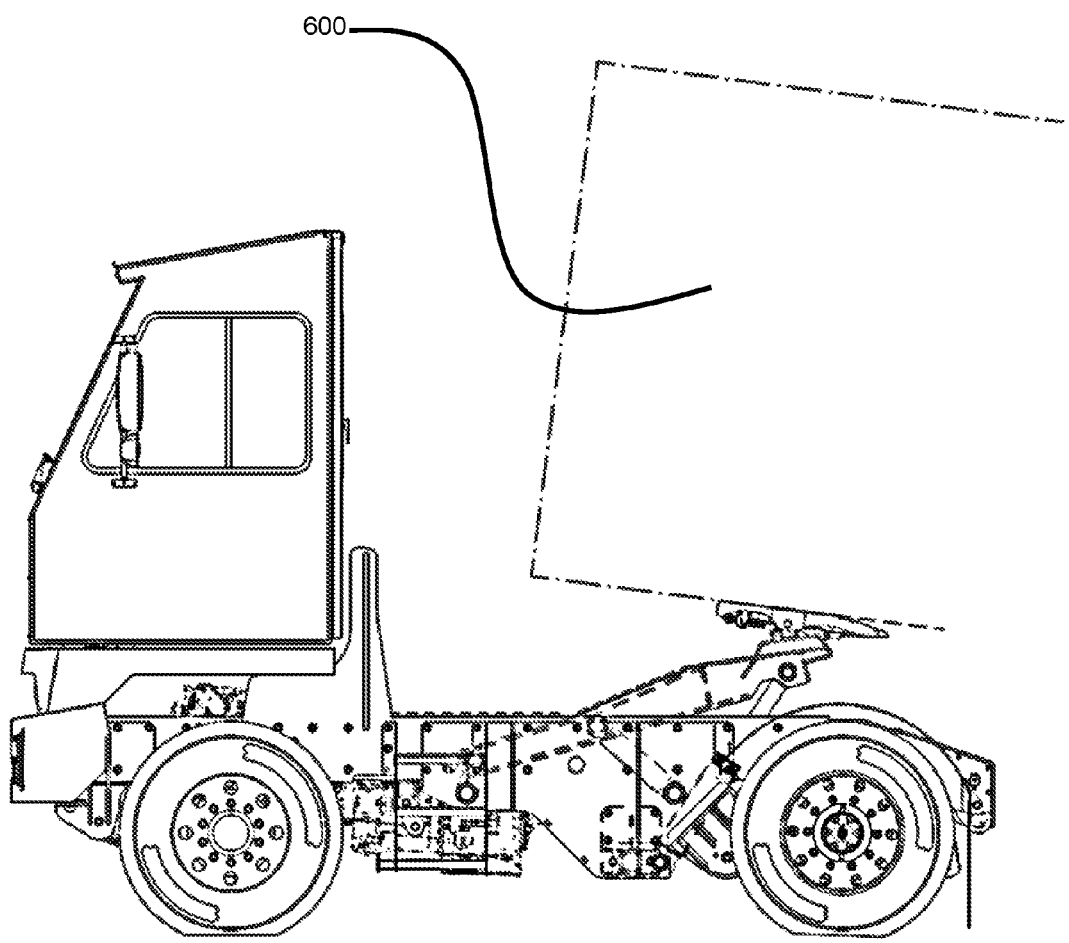
FIG. 8 is the terminal truck from FIG. 6 with a trailer coupled to the fifth wheel assembly.

With reference to the embodiment depicted in FIGS. 1-3, fifth wheel hitch assembly 1 includes hitch plate component 10 and vertical lift component 20, which is mounted on a vehicle frame 30 or base. The frame 30 may be a component of any type of vehicle or work machine. More specifically, the frame 30 or base may be part of any type of work machine configured to tow or otherwise reposition a trailer 600 (see FIG. 6) or other assembly that may be coupled thereto. In one embodiment, the work machine may be a tractor having ground-engaging mechanisms such as wheels and a prime mover coupled thereto to maneuver the tractor along an underlying surface. In this embodiment, the tractor may be coupled to the trailer 600 via the hitch plate component 10 to maneuver the trailer 600 along with the tractor as it travels along the underlying surface. In another embodiment, the work machine may be a pickup truck with the hitch assembly 1 coupled to the frame 30 within a bed of the pickup truck.

Hitch plate component 10 includes mounting member 11 and fifth wheel plate 12 (also referred to herein as "hitch plate 12"), which is used in the mating of the trailer 600 or other component to which the fifth wheel hitch assembly is to be mated. The fifth wheel plate 12 may define a receiver therein sized to correspond with a pin or other structure fixed to the trailer 600. The fifth wheel receiver may be removably coupled to the trailer 600 through the pin. Mounting member 11 includes platform 13 and two spaced apart arms 14 extending from platform 13. In the embodiment shown, platform 13 and arms 14 are rigidly connected to one another. In one embodiment, arms 14 are welded to platform 13. In another embodiment, arms 14 are bolted to platform 13. In yet another embodiment, arms 14 and platform 13 are formed of a single molded, machined or otherwise formed component. In the embodiment depicted in FIGS. 1-3, arms 14 are generally parallel to one another; however, other embodiments are contemplated, including, for example, embodiments in which arms 14 are not parallel. In one embodiment, hitch plate 12 is composed of a durable, commercially available, ferrous or non-ferrous material and mounting member 11 is composed of a durable metal such as steel. In one embodiment, hitch plate component 10 also includes brackets 15 rigidly affixed to mounting member 11, upon which hitch plate 12 can pivot relative to mounting member 11. In one embodiment, brackets 15 are welded to mounting member 11.

In the embodiment depicted in FIGS. 1-3, frame 30 includes left frame member 31 (also referred to as "driver's side frame member" 31), right frame member 32 (also referred to as "curbside frame member" 32), and cross member 33 rigidly affixed to driver's side frame member 31 and curbside frame member 32. In one embodiment, cross member 33 is bolted to driver's side frame member 31 and curbside frame member 32. In another embodiment, cross member 33 is welded to driver's side frame member 31 and curbside frame member 32. In one embodiment, driver's side frame member 31, curbside frame member 32 and cross member 33 are composed of steel.

Arms 14 (which can be referred to as "driver's side arm" and "curbside arm") of mounting member 11 are pivotally and movably connected to the frame 30 by vertical lift component 20, which includes proximal linkages 21 (also referred to as "driver's side proximal linkage 21" and "curbside proximal linkage 21"), intermediate linkages 22 (also referred to as "driver's side intermediate linkage 22" and "curbside intermediate linkage 22") and actuating mechanisms 23 (also referred to as "driver's side actuating mechanism 23" and "curbside actuating mechanism 23"). In one embodiment, actuating mechanisms 23 are hydraulic cylinders; however, other types of actuating mechanisms are contemplated, a variety of which are commercially available. Actuating mechanisms 23 provide the motive force to move hitch plate 12 along the vertical or substantially vertical lift path. Each of actuating mechanisms 23 has a first and second end portion, the first end portion being pivotally connected to platform 13 of mounting member 11 and the second end portion being pivotally connected to cross member 33 of frame 30. In one embodiment, each of actuating mechanisms 23 is connected to both the mounting member 11 and cross member 33 by way of a pivoting bolt or pin mechanism; however other pivoting connectors also are contemplated.

Each arm 14 of mounting member 11 also is connected to the vehicle frame member via the proximal linkage 21 and the intermediate linkage 22. In one embodiment, linkages 21, 22 are made of a durable material such as steel. Each of linkages 21 is a generally linear structural component having predetermined length, a first end portion pivotally connected to an end portion of respective arm 14 of mounting member 11 and a second end portion pivotally connected to respective frame member 31, 32 at a first frame location. Each of linkages 22 also is a generally linear structural component having a predetermined length, a first end portion pivotally connected to an intermediate portion of respective arm 14 of mounting member 11 and a second end portion pivotally connected to respective frame member 31, 32 at a second frame location rearward of the first frame location.

As used herein, the term "length" as it relates to a linkage 21, 22 refers to the distance between the two pivot points of a respective linkage 21, 22. Attachment of mounting member 11 to frame 30 by way of pivotal connections between arms 14, proximal linkages 21, intermediate linkages 22 and actuating mechanisms 23 enables kinematic control of hitch plate 12 and movement of hitch plate 12 along a vertical or substantially vertical lift path. As used herein, the term "vertical" is used to refer to a direction that is substantially perpendicular to the frame of a vehicle on which the fifth wheel assembly is mounted. For purposes of the present disclosure, the term "vertical" includes directions that are within seven (7) degrees of perpendicular to the frame of the vehicle or other device. The predetermined length and pin locations of pivoting linkages 21, 22 and the frame locations at which they are pivotally connected to frame members 31, 32 constrain the movement of the mounting member 11, enabling movement of hitch plate 12 along a vertical or substantially vertical path.

Figure 5:
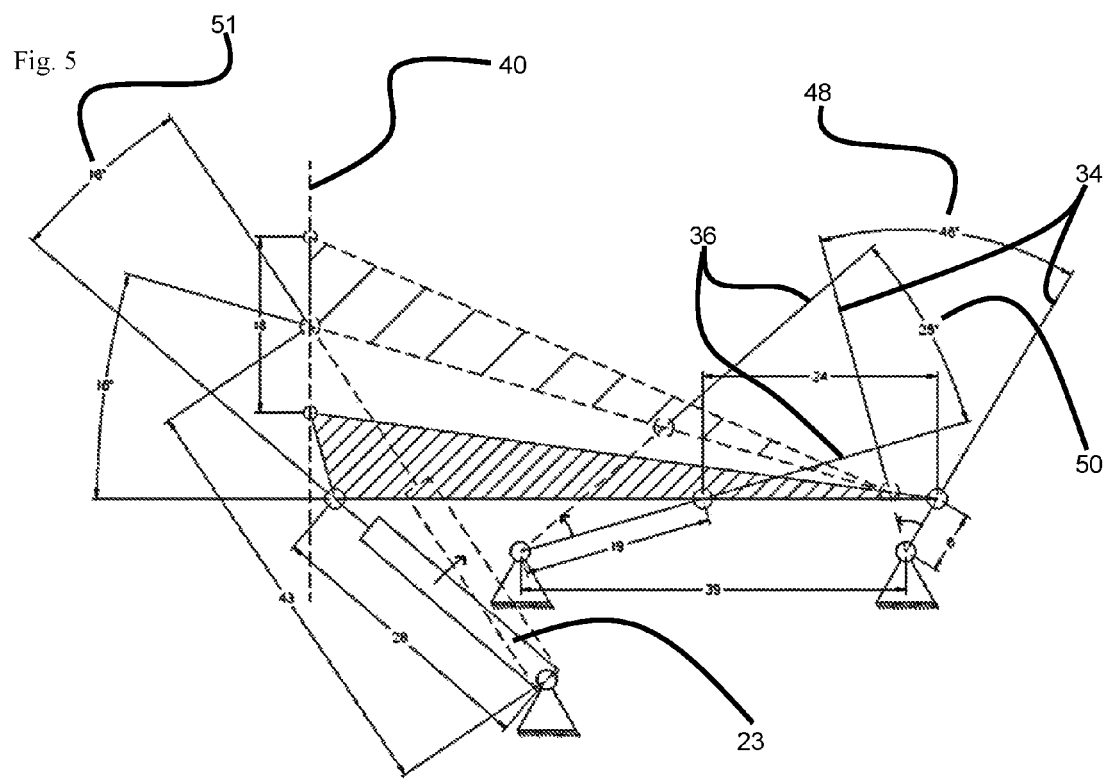
FIG. 5 is a representation of the linkage kinematics as depicted in FIG. 4, with component lengths and distances set forth for one embodiment of the disclosure.

In one embodiment, depicted schematically in FIG. 5, the lengths of intermediate linkages 22 are about 19 inches, the lengths of proximal linkages 21 are about 6 inches, the distance between the first frame location and the second frame location is about 39 inches and the distance between the points where intermediate linkages 22 and proximal linkages 21 are connected to arms 14 is about 24 inches. Use of actuating mechanisms 23 that have a length of about 28 inches in their compressed (retracted) positions and about 43 inches in their extended positions enables a vertical elevation of hitch plate 12 by about 18 inches along a vertical or substantially vertical path. This embodiment is provided only as an example, it being understood that the lengths of linkages and the distances between connection points to the frame and to the arms can be modified by a person of ordinary skill in the art without departing from the present disclosure. It is further understood that the proportions of these lengths and distances are controllable to ensure that the path of the hitch plate remains vertical or substantially vertical.

Referring now to FIG. 3, the hitch assembly 1 is shown isolated from the frame 30. More specifically, the proximal linkage 21 may be coupled to the arm 14 on a first end and to the frame 30 on a second end (see FIG. 2). Further, a proximal linkage axis 34 may be defined along the proximal linkage 21 through the first and second end. Similarly, the intermediate linkage 22 may be coupled to the arm 14 on a first end and to the frame 30 on a second end (see FIG. 2). An intermediate linkage axis 36 may be defined along the intermediate linkage 22 through the first and second end.

In one embodiment, the proximal and intermediate linkages 21, 22 may be pivotally coupled to the frame 30 to define a base axis 38 through the respective coupling locations. The base axis 38 may be substantially parallel to the underlying surface. However, this disclosure is not limited to such a configuration. Rather, the base axis 38 may be angled greater than zero degrees relative to the underlying surface.

While pivotally coupling the intermediate linkage 22 and the proximal linkage 21 to the frame 30 along a base axis 38 that may be parallel to an underlying surface is shown and described above, the base axis 38 may also be angled relative to the underlying surface. In this embodiment, the respective lengths of the proximal and intermediate linkages 21, 22, and their respective coupling locations on the arm 14 and frame 30 may be altered to address the orientation of the base axis 38. More specifically, the proximal and intermediate linkages 21, 22 may be sized and positioned to allow the hitch plate component 10 to be raised along a substantially linear lift path 40 regardless of their coupling locations to the arm 14 and the frame 30.

In one aspect of the present disclosure, the proximal and intermediate linkages 21, 22 may be sized and positioned to define a substantially linear lift path 40 that is perpendicular to a surface plane defined by the underlying surface. More specifically, as the work machine contacts the underlying surface, the ground engaging mechanisms may position the work machine to be substantially aligned with the surface plane. For example, when the work machine is positioned on a substantially planar surface, it is contemplated that substantially linear lift path 40 will be substantially perpendicular to the substantially planar surface. When the work machine is positioned on a surface that is not substantially planar, the underlying surface is defined by a plane intersecting the points at which the ground engaging mechanisms contact the surface or the plane that most closely fits such points. For the hitch assembly 1 to transition between a lowered position 42 and a raised position 44 without generating the stresses described above, the lift path 40 may be substantially perpendicular to the surface plane. For purposes of the present disclosure, "substantially perpendicular" includes directions that are within seven (7) degrees of perpendicular to the underlying surface. By moving the hitch plate 12 along a lift path 40 substantially perpendicular to the underlying surface, the stresses typically induced by arc-shaped lift paths are substantially reduced.

FIG. 3 shows the hitch assembly 1 in the lowered position 42, a middle position 46, and the raised position 44. Also shown in FIG. 3 is a proximal linkage angle 48. The proximal linkage angle 48 may be defined between the base axis 38 and the proximal linkage axis 34 at the portion away from the hitch plate component 10. Similarly, an intermediate linkage angle 50 may be defined between the base axis 38 and the intermediate linkage axis 36 at the portion away from the hitch plate component 10. In one non-limiting example, the proximal linkage angle 48 and the intermediate linkage angle 50 may increase as the hitch assembly 1 transitions from the lowered position 42 to the raised position 44. As described above, the proximal and intermediate linkages 21, 22 may have different lengths and coupling locations. Accordingly, the kinematics of the hitch assembly 1 may be such that the hitch plate 12 travels along the linear lift path 40 as the respective linkage angle 48, 50 changes.

While the respective linkage angles 48, 50 have been described above relative to the base axis 38, the linkage angles 48, 50 can also be described relative to the position of the respective linkage axis 34, 36 in the lowered position 42 compared to the raised position 44 as shown in FIG. 5. More specifically, the proximal link axis 34 may become angularly displaced about the end of the proximal linkage 21 pivotally coupled to the frame 30 by about thirty-six to fifty-six degrees as the hitch assembly 1 transitions from the lowered position 42 to the raised position 44. Similarly, the intermediate linkage axis 36 may become angularly displaced about the end of the intermediate linkage 22 pivotally coupled to the frame 30 by about fifteen to thirty-five degrees as the hitch assembly 1 transitions from the lowered position 42 to the raised position 44. In one non-exclusive embodiment, the proximal link axis 34 may become angularly displaced by about forty-one to fifty-one degrees as the hitch assembly 1 transitions from the lowered position 42 to the raised position 44 and the intermediate linkage axis 36 may become angularly displaced by about twenty to thirty degrees as the hitch assembly 1 transitions from the lowered position 42 to the raised position 44. In yet another embodiment, the proximal link axis 34 may become angularly displaced by about forty-six degrees as the hitch assembly 1 transitions from the lowered position 42 to the raised position 44 and the intermediate linkage axis 36 may become angularly displaced by about twenty-five degrees as the hitch assembly 1 transitions from the lowered position 42 to the raised position 44.

Similarly, in one embodiment the actuating mechanism 23 may pivot about a base pivotally coupled to the frame 23 as the hitch assembly 1 transitions from the lowered position 42 to the raised position 44. More specifically, an actuator angle 51 may define the angular displacement of the actuating mechanism 23 as the hitch assembly 1 transitions from the lowered position 42 to the raised position 44. In one embodiment, the actuator angle 51 may be between about six degrees and twenty-six degrees. In another embodiment, the actuator angle 51 may be between about eleven degrees and twenty-one degrees. In yet another embodiment, the actuator angle 51 may be about sixteen degrees.

Figure 4:
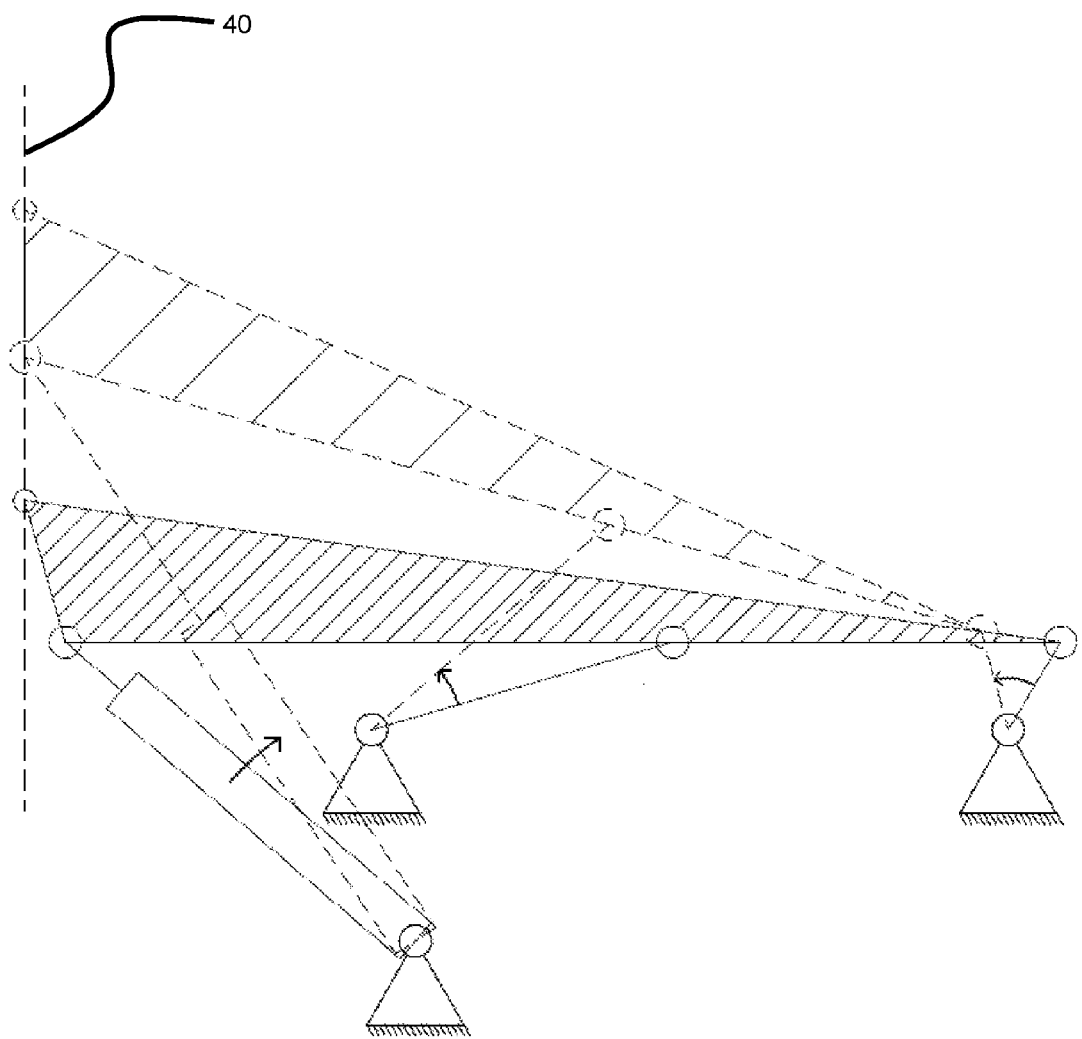
FIG. 4 is a representation of the linkage kinematics of the vertical lift structure of the embodiment depicted in FIG. 1.

The hitch plate component, vertical lift component, and frame work together in such a way as to reduce the amount of stress placed upon the drivetrain of the vehicle when the hitch plate is raised to engage the trailer 600 or other fifth wheel attachment. In prior art systems, the hitch plate assembly is lifted in an arc-shaped path which pulls the tractor or like vehicle and the trailer 600 or like attachment together, putting pressure on both the drivetrain of the braked tractor and the wheels and axles of the braked trailer 600. FIGS. 3 and 4 demonstrate the present disclosure functioning to move the hitch plate within a vertical or substantially vertical path that attenuates the force that would pull the tractor and trailer 600 together in prior art systems. The present disclosure's vertical lift path simply elevates the trailer 600 rather than pushing it up and forward as in prior art.

As will be appreciated from the above descriptions and the referenced drawings, the present disclosure includes a variety of forms, aspects and embodiments, examples of which are summarized below.

In one aspect, the disclosure provides a fifth wheel hitch assembly for elevating a hitch plate as used in connecting a tractor and a tractor trailer, or such similar connections. In one embodiment, a fifth wheel hitch assembly includes a hitch plate component and a vertical lift component connected to the hitch plate component. The vertical lift component includes at least one actuating mechanism and a plurality of linkages, wherein each of the at least one vertical lift component and plurality of linkages is pivotally connected to the hitch plate component and is pivotally connected to a vehicle frame. In one embodiment, the hitch plate component includes a hitch plate and a mounting member. In one embodiment, the mounting member includes a platform adapted to support the hitch plate, a first arm extending from the platform on a driver's side of the mounting member and having an end portion opposite the platform, and a second arm extending from the platform on a curbside of the mounting member and having an end portion opposite the platform. In another embodiment, the first and second arms are connected directly to the hitch plate.

In another embodiment, the vertical lift component includes: (i) a first actuating mechanism having first and second end portions, the first actuating mechanism being pivotally connected to the hitch plate component at the first end portion of the first actuating mechanism and pivotally connected to a vehicle frame at the second end portion; (ii) a first proximal linkage pivotally connected to the end portion of the first arm and pivotally connected to the vehicle frame; (iii) a first intermediate linkage pivotally connected to the first arm between the end portion of the first arm and the platform and pivotally connected to the vehicle frame; (iv) a second actuating mechanism having first and second end portions, the second actuating mechanism being pivotally connected to the hitch plate component at the first end portion of the second actuating mechanism and pivotally connected to the vehicle frame at the second end portion; (v) a second proximal linkage pivotally connected to the end portion of the second arm and pivotally connected to the vehicle frame; and (vi) a second intermediate linkage pivotally connected to the second arm between the end portion of the second arm and the platform and pivotally connected to the vehicle frame.

One embodiment includes a fifth wheel hitch assembly comprising a hitch plate component and a vertical lift component connected to the hitch plate component. In another embodiment, the vertical lift component includes at least one actuating mechanism and a plurality of linkages and each of the at least one actuating mechanism and plurality of linkages is pivotally connected to the hitch plate component and is pivotally connected to a vehicle frame.

In one example, the hitch plate component includes a hitch plate, the actuating mechanism transitions the hitch plate component between a lowered position and a raised position, and the vertical lift component constrains the hitch plate to traveling along a lift path as the hitch plate component transitions between the lowered position and the raised position. In one embodiment, the lift path is substantially perpendicular to the vehicle frame. In another embodiment, the lift path is substantially perpendicular to a ground surface.

In another embodiment, the hitch plate component includes an arm coupled to the hitch plate and extending away therefrom and the vertical lift component includes a proximal linkage pivotally coupled to the vehicle frame on one end and pivotally coupled to the arm on the other end, and an intermediate linkage pivotally coupled to the frame on one end and pivotally coupled to the arm on the other end. In one embodiment, the intermediate linkage is coupled to the arm at a location between the hitch plate and the proximal linkage. In another embodiment, the intermediate linkage is longer than the proximal linkage. In another embodiment, both the proximal linkage and the intermediate linkage pivot relative to the vehicle frame as the actuating mechanism transitions the hitch plate component between a lowered position and a raised position.

In another embodiment, the hitch plate component includes a hitch plate and a mounting member, the mounting member including a platform adapted to support the hitch plate, a first arm extending from the platform on a driver's side of the mounting member and having an end portion opposite the platform, and a second arm extending from the platform on a curbside of the mounting member and having an end portion opposite the platform. In this embodiment, the vertical lift component includes (i) a first actuating mechanism having first and second end portions, the first actuating mechanism being pivotally connected to the hitch plate component at the first end portion and pivotally connected to a vehicle frame at the second end portion, (ii) a first proximal linkage pivotally connected to the end portion of the first arm and pivotally connected to the vehicle frame, (iii) a first intermediate linkage pivotally connected to the first arm between the end portion of the first arm and the platform and pivotally connected to the vehicle frame, (iv) a second actuating mechanism having first and second end portions, the second actuating mechanism being pivotally connected to the hitch plate component at the first end portion and pivotally connected to a vehicle frame at the second end portion, (v) a second proximal linkage pivotally connected to the end portion of the second arm and pivotally connected to the vehicle frame, and (vi) a second intermediate linkage pivotally connected to the second arm between the end portion of the second arm and the platform and pivotally connected to the vehicle frame.

In another embodiment, a hitch assembly is pivotally coupled to a base, and includes a hitch plate coupled to an arm and a linkage assembly pivotally coupling the arm to the base. In this embodiment, the hitch plate is movable between a lowered position and a raised position and the hitch plate travels along a lift path as the hitch plate moves between the lowered position and the raised position.

In one example, the linkage assembly includes (i) a proximal linkage pivotally coupled to the arm at a first end and the base at a second end, the proximal linkage defining a proximal axis through the first and second end, and (ii) an intermediate linkage pivotally coupled to the arm at a first end and the base at a second end, the intermediate linkage defining an intermediate axis through the first and second end. Further, a base axis may be defined through the second end of the proximal linkage and the second end of the intermediate linkage, wherein an intermediate linkage angle is defined between the intermediate axis and the base axis, a proximal linkage angle is defined between the proximal axis and the base axis, and as the hitch plate moves between the lowered position and the raised position the intermediate linkage angle and the proximal linkage angle change. In another embodiment, the proximal linkage has a proximal linkage length defined between the first end and the second end of the proximal linkage, the intermediate linkage has an intermediate linkage length defined between the first end and the second end of the intermediate linkage, and the proximal linkage length is between one-fourth and one half the intermediate linkage length.

In another aspect, there is provided a fifth wheel hitch assembly system that includes a work machine having a frame, one or more ground engaging mechanism coupled to the frame, a hitch component that includes a hitch plate, and a lift component pivotally coupling the hitch component to the frame, wherein the lift component is operable to reposition the hitch component relative to the frame between a lowered position and a raised position to move the hitch plate along a substantially linear path.

In one embodiment, an actuator transitions the hitch component between the lowered position and the raised position. In another embodiment, the lift path is defined by the hitch plate as the hitch component transitions from the lowered position to the raised position. In yet another embodiment, the ground engaging mechanism is positioned on an underlying surface defining a surface plane and the lift path is within seven degrees of perpendicular to the surface plane.

In another embodiment, the hitch component includes an arm coupled to the hitch plate and extending away therefrom and the lift component includes (i) a proximal linkage pivotally coupled to the frame on one end and pivotally coupled to the arm on the other end, and (ii) an intermediate linkage pivotally coupled to the frame on one end and pivotally coupled to the arm on the other end. In one embodiment, both the proximal linkage and the intermediate linkage are operable to pivot relative to the frame as the actuating mechanism transitions the hitch component between the lowered position and the raised position.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fifth wheel hitch assembly pivotally coupled to a frame, comprising:
   a hitch plate component comprising a hitch plate; and
   a vertical lift component connected to the hitch plate component;
   wherein the vertical lift component includes at least one actuating mechanism and a plurality of linkages, each of the plurality of linkages pivotally coupled to the frame on one end;
   further wherein the at least one actuating mechanism is operable to transition the hitch plate between a lowered position and a raised position; and
   further wherein the vertical lift component constrains the hitch plate to traveling along a lift path that is substantially linear as the hitch plate component transitions between the lowered position and the raised position.

2. The fifth wheel assembly of claim 1, wherein the hitch plate component further comprises:
   a mounting member, the mounting member including a platform adapted to support said hitch plate;
   a first arm extending from the platform on a first side of the mounting member and having an end portion opposite the platform; and
   a second arm extending from the platform on a second side of the mounting member and having an end portion opposite the platform.

3. The fifth wheel hitch assembly of claim 1, further wherein the lift path is substantially perpendicular to the frame.

4. The fifth wheel hitch assembly of claim 1, wherein the lift path is substantially perpendicular to a ground surface.

5. The fifth wheel hitch assembly of claim 1, wherein the hitch plate component further comprises an arm coupled to the hitch plate and extending away therefrom; and
   wherein the plurality of linkages of the vertical lift component comprises:
   a proximal linkage pivotally coupled to the frame on one end and pivotally coupled to the arm on the other end; and
   an intermediate linkage pivotally coupled to the frame on one end and pivotally coupled to the arm on the other end.

6. The fifth wheel hitch assembly of claim 5, further wherein the intermediate linkage couples to the arm at a location between the hitch plate and the proximal linkage.

7. The fifth wheel assembly of claim 5, further wherein the intermediate linkage is longer than the proximal linkage.

8. The fifth wheel assembly of claim 5, wherein both the proximal linkage and the intermediate linkage pivot relative to the frame as the actuating mechanism transitions the hitch plate component between a lowered position and a raised position.

9. A fifth wheel hitch assembly comprising:
   a hitch plate component comprising a hitch plate; a mounting member, the mounting member including a platform adapted to support said hitch plate; a first arm extending from the platform on a first side of the mounting member and having an end portion opposite the platform; and a second arm extending from the platform on a second side of the mounting member and having an end portion opposite the platform; and
   a vertical lift component connected to the hitch plate component;
   wherein the vertical lift component includes at least one actuating mechanism and a plurality of linkages;
   wherein the at least one actuating mechanism is operable to transition the hitch plate between a lowered position and a raised position;
   wherein the vertical lift component constrains the hitch plate to traveling along a lift path that is substantially linear as the hitch plate component transitions between the lowered position and the raised position;

wherein the at least one actuating mechanism of the vertical lift component comprises a first actuating mechanism having first and second end portions, the first actuating mechanism being pivotally connected to the hitch plate component at the first end portion and pivotally connected to a frame at the second end portion, and a second actuating mechanism having first and second end portions, the second actuating mechanism being pivotally connected to the hitch plate component at the first end portion and pivotally connected to the frame at the second end portion; and wherein, the plurality of linkages comprises a first proximal linkage pivotally connected to the end portion of the first arm and pivotally connected to the frame, a second proximal linkage pivotally connected to the end portion of the second arm and pivotally connected to the frame, a first intermediate linkage pivotally connected to the first arm between the end portion of the first arm and the platform and pivotally connected to the frame, and a second intermediate linkage pivotally connected to the second arm between the end portion of the second arm and the platform and pivotally connected to the frame.

10. A fifth wheel hitch assembly system comprising:

a work machine having a frame;

one or more ground engaging mechanism coupled to the frame;

a hitch component including a hitch plate; and a lift component having at least one proximal linkage and at least one intermediate linkage pivotally coupling the hitch component to the frame, each of the proximal and intermediate linkages having a first end pivotally coupled to the frame at a fixed frame location and a second end pivotally coupled to the hitch component;

wherein the lift component repositions the hitch component relative to the frame between a lowered position and a raised position to move the hitch plate along a substantially linear path.

11. The fifth wheel hitch assembly system of claim 10, further wherein an actuator transitions the hitch component between the lowered position and the raised position.

12. The fifth wheel hitch assembly system of claim 10, further wherein the lift path is defined by the hitch plate as the hitch component transitions from the lowered position to the raised position.

13. The fifth wheel hitch assembly system of claim 12, further wherein the ground engaging mechanism is positioned on an underlying surface defining a surface plane;

further wherein, the lift path is within seven degrees of perpendicular to the surface plane.

14. The fifth wheel hitch assembly system of claim 10, wherein the hitch component further comprises an arm coupled to the hitch plate and extending away therefrom; and wherein the proximal linkage is pivotally coupled to the frame on one end and pivotally coupled to the arm on the other end; and the intermediate linkage is pivotally coupled to the frame on one end and pivotally coupled to the arm on the other end.

15. The fifth wheel assembly system of claim 14, wherein both the proximal linkage and the intermediate linkage pivot relative to the frame as the actuating mechanism transitions the hitch component between the raised position and the lowered position.

\* \* \* \* \*